(12) United States Patent
Shen et al.

(10) Patent No.: US 11,681,118 B2
(45) Date of Patent: Jun. 20, 2023

(54) OPTICAL ELEMENT DRIVING MECHANISM

(71) Applicant: TDK TAIWAN CORP., Taoyuan (TW)

(72) Inventors: Wei-Jhe Shen, Taoyuan (TW);
Kun-Shih Lin, Taoyuan (TW);
Yung-Ping Yang, Taoyuan (TW);
Chun-Chieh Chang, Taoyuan (TW);
Sheng-Chang Lin, Taoyuan (TW);
Che-Hsiang Chiu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 243 days.

(21) Appl. No.: 17/112,207

(22) Filed: Dec. 4, 2020

(65) Prior Publication Data

US 2021/0173172 A1   Jun. 10, 2021

Related U.S. Application Data

(60) Provisional application No. 62/986,039, filed on Mar. 6, 2020, provisional application No. 62/944,496, filed on Dec. 6, 2019.

(51) Int. Cl.
*G02B 7/09* (2021.01)
*G02B 27/64* (2006.01)

(52) U.S. Cl.
CPC ............. *G02B 7/09* (2013.01); *G02B 27/646* (2013.01)

(58) Field of Classification Search
CPC ... G02B 7/09; G02B 7/00; G02B 7/04; G02B 7/02; G02B 27/646; G02B 27/64; G03B 5/00; G03B 13/36; G03B 2205/0015
See application file for complete search history.

(56) References Cited

U.S. PATENT DOCUMENTS

2015/0355476 A1* 12/2015 Bach .................. G02B 26/0883
359/554
2019/0136839 A1*  5/2019 Miller ...................... G02B 3/12

* cited by examiner

*Primary Examiner* — Darryl J Collins
*Assistant Examiner* — Tamara Y. Washington
(74) *Attorney, Agent, or Firm* — Muncy, Geissler, Olds & Lowe, P.C.

(57) ABSTRACT

An optical element driving mechanism having an optical axis includes a fixed portion, a movable portion, and a driving assembly. The movable portion is connected to the fixed portion. The driving assembly drives the movable portion to move in a direction that is parallel to the optical axis relative to the fixed portion, when viewed in the direction that is parallel to the optical axis, the optical element driving mechanism is a rectangular structure with a first side, a second side, a third side, and a fourth side, the first side and the third side are opposite, and the first side is adjacent to the second side and the fourth side.

19 Claims, 10 Drawing Sheets

OPTICAL ELEMENT DRIVING MECHANISM

CROSS-REFERENCE TO RELATED APPLICATIONS

The present application claims priority of U.S. Provisional Patent Application No. 62/944,496, filed 6 Dec. 2019, and No. 62/986,039, filed 6 Mar. 2020, which are incorporated by reference herein in their entirety.

BACKGROUND OF THE DISCLOSURE

Field of the Disclosure

The present invention relates to a driving mechanism, and more particularly to an optical element driving mechanism.

Description of the Related Art

The design of today's electronic devices is continually moving toward miniaturization, so that various elements or structures of optical module used in such applications as imaging must be continuously reduced in size in order to achieve miniaturization. Therefore, how to design a miniature optical element driving mechanism has become an important issue.

BRIEF SUMMARY OF THE DISCLOSURE

An embodiment of the invention provides an optical element driving mechanism having an optical axis includes a fixed portion, a movable portion, and a driving assembly. The movable portion is connected to the fixed portion. The driving assembly drives the movable portion to move in a direction that is parallel to the optical axis relative to the fixed portion, when viewed in the direction that is parallel to the optical axis, the optical element driving mechanism is a rectangular structure with a first side, a second side, a third side, and a fourth side, the first side and the third side are opposite, and the first side is adjacent to the second side and the fourth side.

According to some embodiments of the present disclosure, the movable portion includes a through hole, a receiving groove, a counterweight element, a first groove and a second groove. The through hole has a center, and the optical axis passes through the center of the through hole. The receiving groove is disposed on the first side and the second side. The counterweight element is disposed on the receiving groove. The first groove is disposed on the first side. The second groove is disposed on the second side. A shortest distance from the center of the through hole to the first side is greater than a shortest distance from the center of the through hole to the third side, and the shortest distance from the center of the through hole to the first side is greater than a shortest distance from the center of the through hole to the fourth side. A shortest distance from the center of the through hole to the second side is greater than the shortest distance from the center of the through hole to the third side, and the shortest distance from the center of the through hole to the second side is greater than the shortest distance from the center of the through hole to the fourth side.

According to some embodiments of the present disclosure, the fixed portion includes a base, a first circuit component, a second circuit component, and a housing. The first circuit component and the second circuit component are disposed on the base, the housing is connected to the base. The first circuit component and the second circuit component are electrically independent of each other. The first circuit component is disposed on the first side, the fourth side, and the third side, and the second circuit component has a plurality of electrical connection elements disposed on the second side. The housing has a ground element, the ground element is disposed on the second side, and the ground element is disposed between the electrical connection elements.

According to some embodiments of the present disclosure, the optical element driving mechanism further includes a first elastic element and a second elastic element, which are connected to the movable portion and the fixed portion. When viewed in the direction that is parallel to the optical axis, the first elastic element and the second elastic element at least partially overlap. The first elastic element has a plurality of fixed-portion-connecting portions, a plurality of movable-portion-connecting portions, a plurality of elastic portions, a plurality of inner auxiliary portions and a plurality of external auxiliary portions. The fixed-portion-connecting portions are fixedly connected to the fixed portion. The movable-portion-connecting portions are fixedly connected to the movable portion. The elastic portions has an elastic material, and the movable-portion-connecting portions are movably connected to the fixed-portion-connecting portions via the elastic portions. The inner auxiliary portions are disposed on the second side and the fourth side, and each of the inner auxiliary portions is connected to two movable-portion-connecting portions. The external auxiliary portions are disposed on the first side, the second side, and the third side, and each of the external auxiliary portions is connected to two fixed-portion-connecting portions. The second elastic element includes a first part and a second part. The first part has a fixed-portion-connecting portion, a movable-portion-connecting portion, an elastic portion and a driving-portion-connecting portion. The fixed-portion-connecting portion is fixedly connected to the fixed portion. The movable-portion-connecting portion is fixedly connected to the movable portion. The elastic portion has an elastic material, and the movable-portion-connecting portion is movably connected to the fixed-portion-connecting portion via the elastic portion. The driving-portion-connecting portion extends from the movable-portion-connecting portion to be connected to the driving assembly. The second part has a plurality of fixed-portion-connecting portions, a plurality of movable-portion-connecting portion, a plurality of elastic portions and a driving-portion-connecting portion. The fixed-portion-connecting portions are fixedly connected to the fixed portion. The movable-portion-connecting portions are fixedly connected to the movable portion. The elastic portions have an elastic material, and the movable-portion-connecting portions are movably connected to the fixed-portion-connecting portions via the elastic portions. The driving-portion-connecting portion extends from the movable-portion-connecting portion to be connected to the driving assembly. The first part is not connected to the second part.

According to some embodiments of the present disclosure, the movable portion further comprises a first winding column and a second winding column, the first winding column and the second winding column are disposed on the first side, and the driving assembly comprises a driving coil, the driving coil is disposed on a side surface of the movable portion, and one end of the driving coil is wound around the first winding column and is connected to the driving-portion-connecting portion of the first part, and the other end of the driving coil is wound around the second winding column and is connected to the driving-portion-connecting portion of the second part. A partition portion is disposed between the first winding column and the second winding column, and a first accommodating portion is formed between the partition portion and the first winding column, and a second accommodating portion is formed between the partition and the second winding column, the first accommodating portion accommodates the driving-portion-connecting portion of the first part, and the second accommodating portion accommodates the driving-portion-connecting portion of the second part. The driving-portion-connecting portion of the first part is connected to the driving coil wound around the first winding column by a bonding element, and the driving-portion-connecting portion of the second part is connected to the driving coil wound around the second winding column by another bonding element. When viewed in the direction that is parallel to the optical axis, the driving-portion-connecting portion of the first part and the first winding column does not overlap, and the driving-portion-connecting portion of the second part and the second winding column does not overlap.

According to some embodiments of the present disclosure, the driving-portion-connecting portion of the first part and the driving coil wound around the first winding column are welded by laser, and the driving-portion-connecting portion of the second part and the driving coil wound around the second winding column are welded by laser. When viewed in the direction that is parallel to the optical axis, the driving-portion-connecting portion of the first part overlaps the first winding column, and the driving-portion-connecting portion of the second part overlaps the second winding column.

According to some embodiments of the present disclosure, the optical element driving mechanism further includes a position sensing assembly, which is disposed on the second side. The position sensing assembly includes a reference element and a position sensing element. The position sensing element corresponds to the reference element to sense the movement of the movable portion relative to the fixed portion. When viewed in the direction that is parallel to the optical axis, the reference element and the position sensing element at least partially overlap.

According to some embodiments of the present disclosure, the optical element driving mechanism further includes a damping element. The fixed portion includes a base, and the base has a concave portion. The movable portion has a convex portion, and the convex portion corresponds to the concave portion. The damping element is disposed between the convex portion and the concave portion. The optical element driving mechanism further includes three other damping elements, wherein the base further has three other concave portions, the movable portion further has three other convex portions, and the four damping elements, the four concave portions, and the four convex portions are respectively disposed adjacent to four corners of the rectangular structure, and are formed four stabilizing assemblies. When viewed in the direction that is parallel to the optical axis, the convex portion, the damping element, and the concave portion in any one of the four stabilizing assemblies at least partially overlap.

BRIEF DESCRIPTION OF THE DRAWINGS

Aspects of this disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 1:
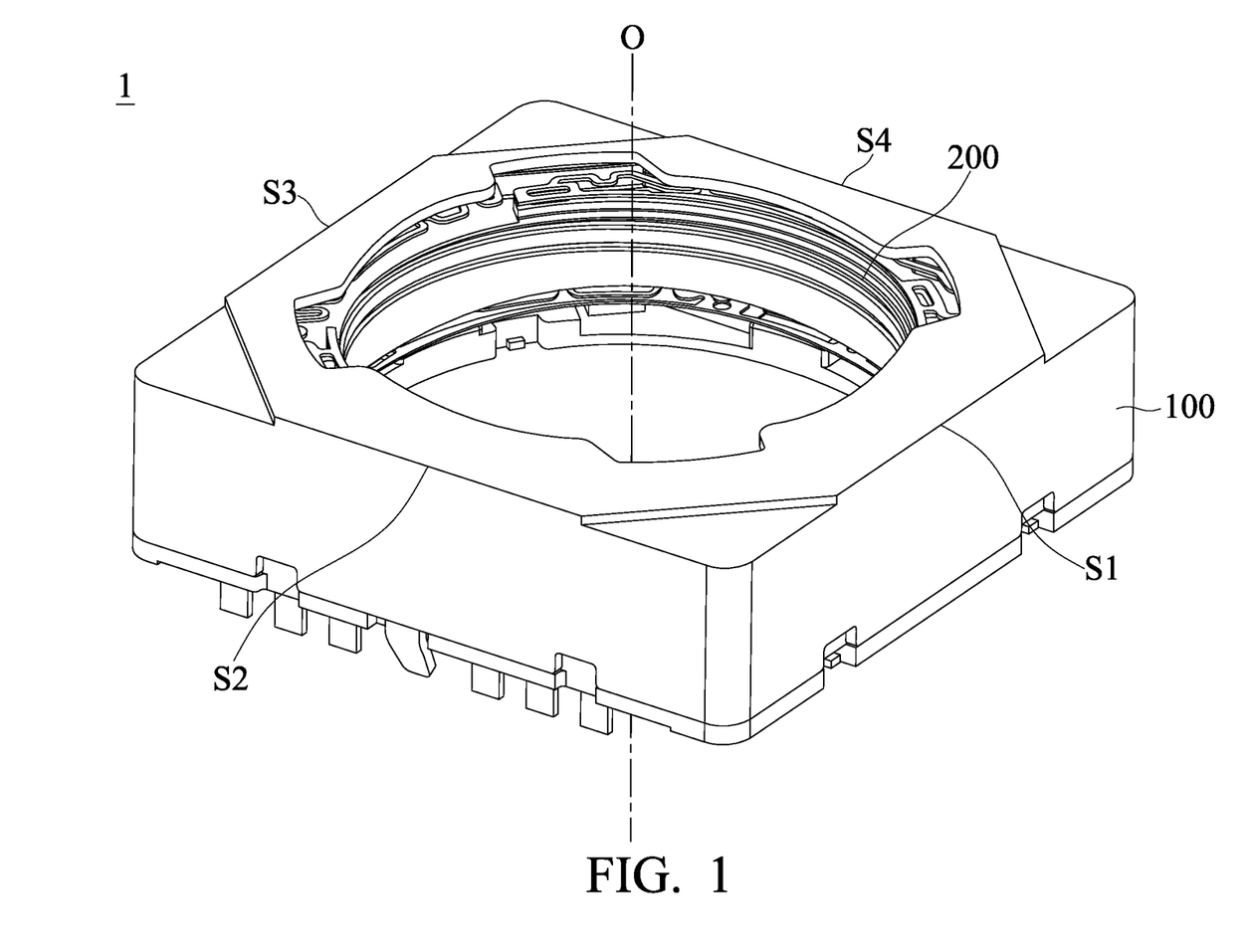
FIG. 1 is a perspective view of an optical element driving mechanism according to an embodiment of the present disclosure.
Figure 2:
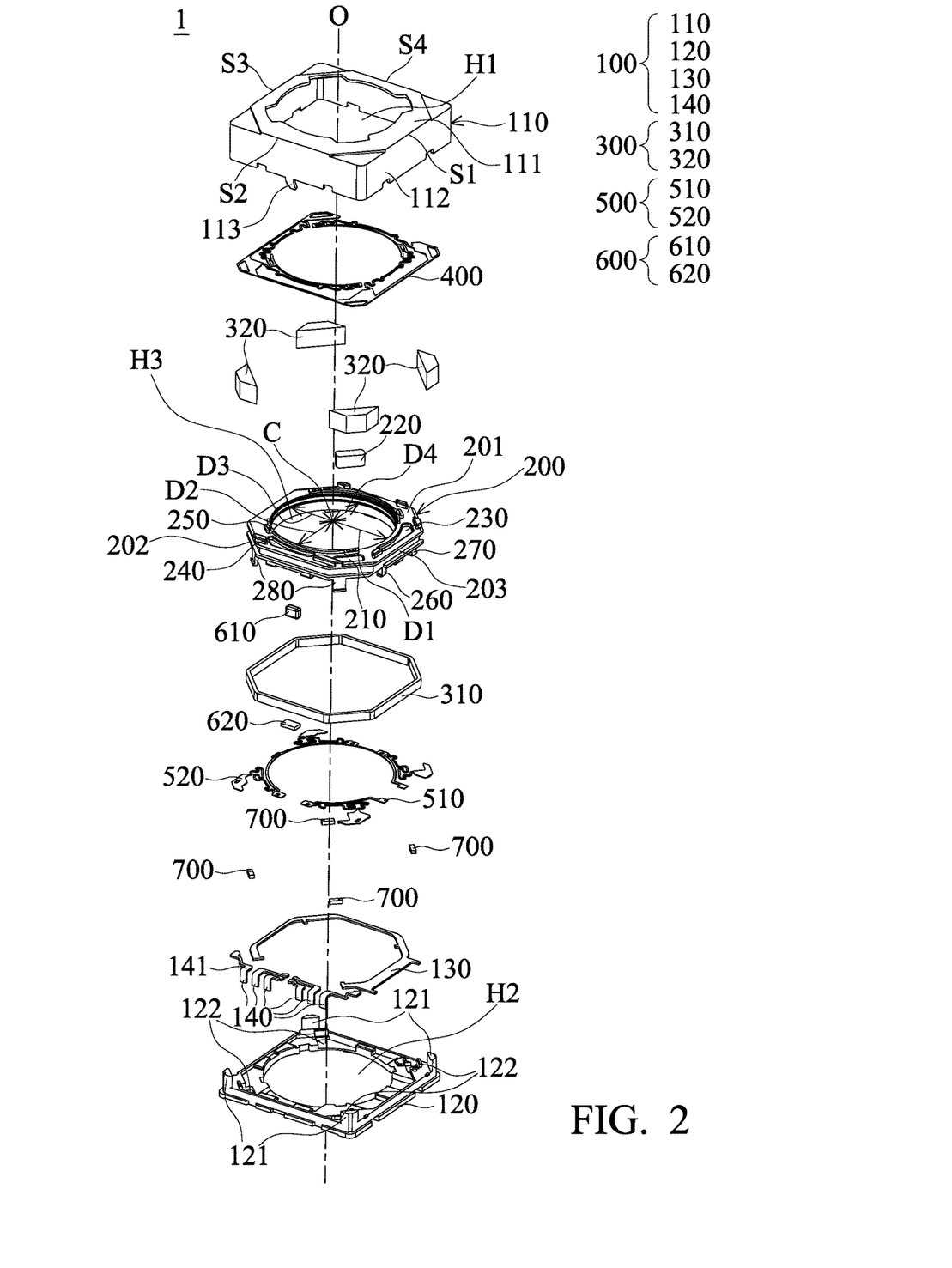
FIG. 2 is an exploded view of an optical element driving mechanism according to an embodiment of the present disclosure.

Refer to FIG. 1 and FIG. 2. FIG. 1 is a perspective view of an optical element driving mechanism 1 according to an embodiment of the present disclosure. FIG. 2 is an exploded view of the optical element driving mechanism 1 according to an embodiment of the present disclosure. The optical element driving mechanism 1 having an optical axis O includes a fixed portion 100, a movable portion 200, a driving assembly 300, a first elastic element 400, a second elastic element 500, a position sensing assembly 600, and four damping element 700. When viewed in a direction that is parallel to the optical axis O, the optical element driving mechanism 1 is a rectangular structure with a first side S1, a second side S2, a third side S3, and a fourth side S4. The first side S1 is opposed to the third side S3, and the first side S1 is adjacent to the second side S2 and the fourth side S4. In the following description, the first side S1, the second side S2, the third side S3, and the fourth side S4 may include the structures of the optical element driving mechanism 1 on the first side S1, the second side S2, the third side S3, and the fourth side S4. In this embodiment, the optical element driving mechanism 1 may be a voice coil motor (VCM) with an auto focusing (AF) function, but it is not limited to this. In some embodiments, the optical element driving mechanism 1 may also have auto focusing and optical image stabilization (OIS) functions.

As shown in FIG. 2, the fixed portion 100 includes a housing 110, a base 120, a first circuit component 130, and a second circuit component 140. The housing 110 has a top surface 111, four side walls 112 extending from the edge of the top surface 111 in the direction that is parallel to the optical axis O, and a grounding element 113. The base 120 and the housing 110 are arranged along the optical axis O, and have four positioning columns 121 and four concave portions 122. The four positioning columns 121 are disposed at the four corners of the base 120, and the four concave portions 122 are respectively disposed adjacent to the four positioning columns 121. It should be understood that the housing 110 and the base 120 are respectively formed with a housing opening H1 and a base opening H2. The housing opening H1 corresponds to the base opening H2, and the base opening H2 corresponds to image sensing elements (not shown) outside the optical element driving mechanism 1. External light may enter the housing 110 through the housing opening H1, and then pass through an optical element (not shown) and the base opening H2, and then be received by the image sensing elements to generate a digital image signal.

The first circuit component 130 and the second circuit component 140 are disposed on the base 120, and the first circuit component 130 and the second circuit component 140 are electrically independent of each other. The first circuit component 130 is disposed on the first side S1, the fourth side S4, and the third side S3. In more detail, the first circuit component 130 has a nearly C-shaped structure and extends from the first side S1 through the fourth side S4 to the third side S3, and the first circuit component 130 is embedded in the base 120. In addition to serving as a path for electrical conduction, the structure of the base 120 may also be strengthened due to the metal material of the first circuit component 130. The second circuit component 140 has six electrical connection elements 141, which are disposed on the second side S2. The ground element 113 of the housing 110 is disposed on the second side S2, and the ground element 113 is disposed between the electrical connection elements 141.

The movable portion 200 may be connected to an optical element, and may move relative to the fixed portion 100 in the direction that is parallel to the optical axis O. In this embodiment, the movable portion 200 is a holder, including a through hole H3, an upper surface 201, a lower surface 202, a side surface 203, a receiving groove 210, a counterweight element 220, a first groove 230, a second groove 240, a plurality of positioning portions 250, a first winding column 260, a second winding column 270, and four convex portions 280. The upper surface 201 is closer to the top surface 111 of the housing 110 than the lower surface 202. The through hole H3 has a center C, and the optical axis O passes through the center C of the through hole H3. The through hole H3 forms a threaded structure corresponding to another threaded structure on the outer peripheral surface of the optical element, so that the optical element may be secured in the through hole H3.

A shortest distance D1 from the center C of the through hole H3 to the first side S1 is greater than a shortest distance D3 from the center C of the through hole H3 to the third side S3, and a shortest distance D1 from the center C of the through hole H3 to the first side S1 is greater than a shortest distance D4 from the center C of the through hole H3 to the fourth side S4. A shortest distance D2 from the center C of the through hole H3 to the second side S2 is greater than the shortest distance D3 from the center C of the through hole H3 to the third side S3, and the shortest distance D2 from the center C of the through hole H3 to the second side S2 is greater than the shortest distance D4 from the center C of the through hole H3 to the fourth side S4. Therefore, the optical element driving mechanism 1 in this embodiment is an eccentric structure in which the optical axis O does not pass through the center of the rectangular structure.

The receiving groove 210 is disposed on the first side S1 and the second side S2. The counterweight element 220 is disposed in the receiving groove 210. The first groove 230 is disposed on the first side S1. The second groove 240 is disposed on the second side S2. The receiving groove 210, the first groove 230, and the second groove 240 are all recessed structures, which are formed from the upper surface 201 recessed toward the base 120 in a direction that is parallel to the optical axis O. Since the movable portion 200 is an eccentric structure whose center is biased toward the third side S3 and the fourth side S4, by arranging the receiving groove 210 spanning the first side S1 and the second side S2 to accommodate the counterweight element 220, the stability of the movement of the movable portion 200 relative to the fixed portion 100 may be improved. In addition, the first groove 230 and the second groove 240 are disposed near the receiving groove 210 to reduce the total weight of the movable portion 200, so that the movable portion 200 may move stably and maintain balance.

A plurality of positioning portions 250 are respectively disposed on the upper surface 201 and the lower surface 202 of the movable portion 200 for positioning the first elastic element 400 and the second elastic element 500. The first winding column 260 and the second winding column 270 are disposed on the first side S1. In some embodiments, the first winding column 260 and the second winding column 270 are a protruding structure, which are formed from the lower surface 202 protruding toward the base 120 in a direction that is parallel to the optical axis O. In other embodiments, the first winding column 260 and the second winding column 270 are formed from the side surface 203 protruding toward the side wall 112 of the housing 110 in a direction that is perpendicular to the optical axis O.

The driving assembly 300 includes a driving coil 310 and four magnetic elements 320. The driving coil 310 is disposed on the side surface 203 of the movable portion 200. In more detail, the driving coil 310 is wound around the side surface 203 of the movable portion 200. Each of the four magnetic elements 320 is disposed in a space formed between the positioning column 121 of the base 120 and the movable portion 200, and is fixed to the positioning column 121. The magnetic element 320 may be a magnet, wherein one pole (for example, the N pole) of the magnet faces the driving coil 310. In this embodiment, the driving coil 310 and the four magnetic elements 320 constitute the driving assembly 300 for driving the movable portion 200 to move relative to the fixed portion 100. It should be understood that although the number of the magnetic elements 320 is four, and the magnetic elements 320 are disposed at the corners in this embodiment, the number and arrangement of magnetic elements 320 are not limited to this.

Figure 3:
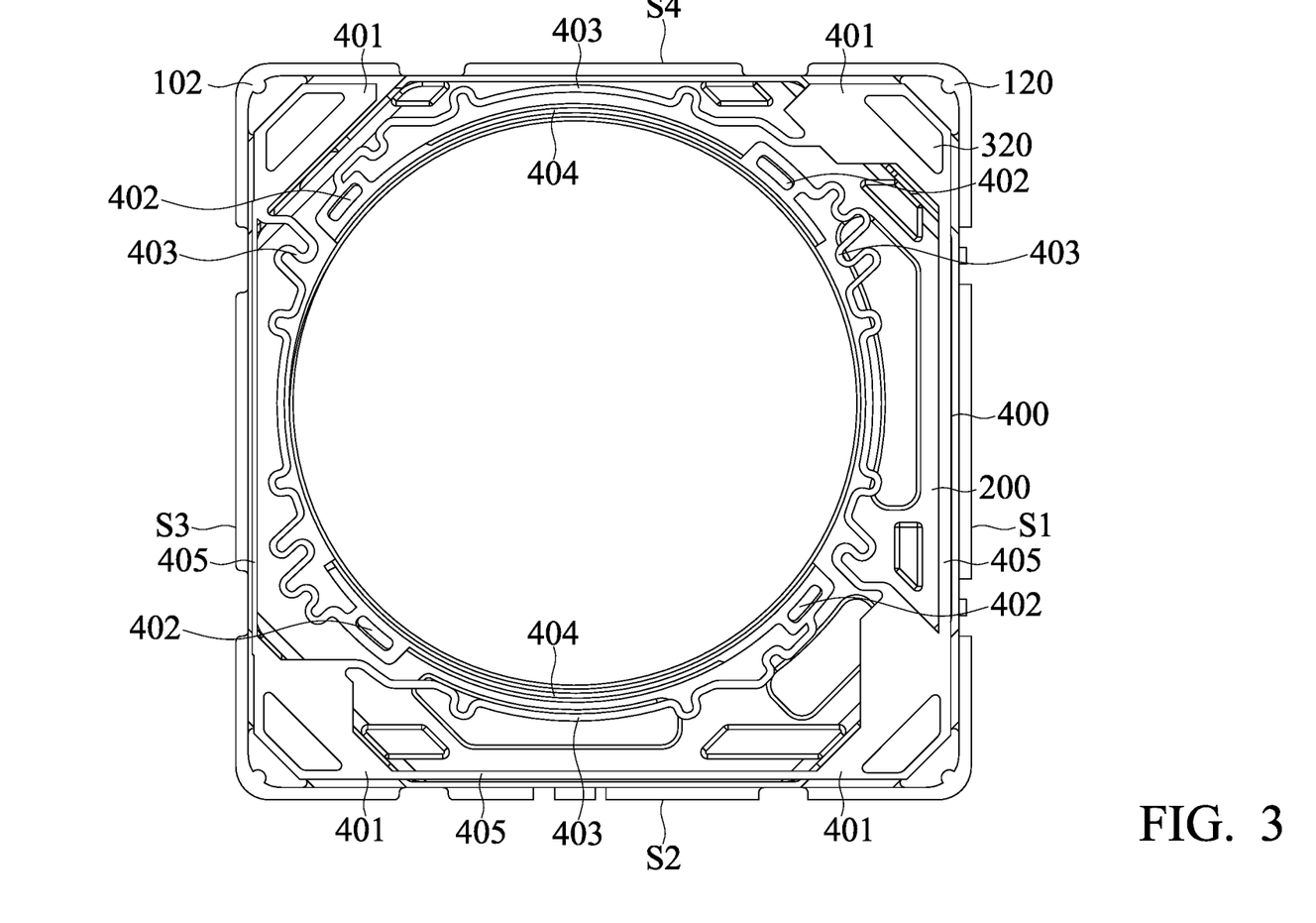
FIG. 3 is a top view of partial elements of an optical element driving mechanism according to an embodiment of the present disclosure.
Figure 4:
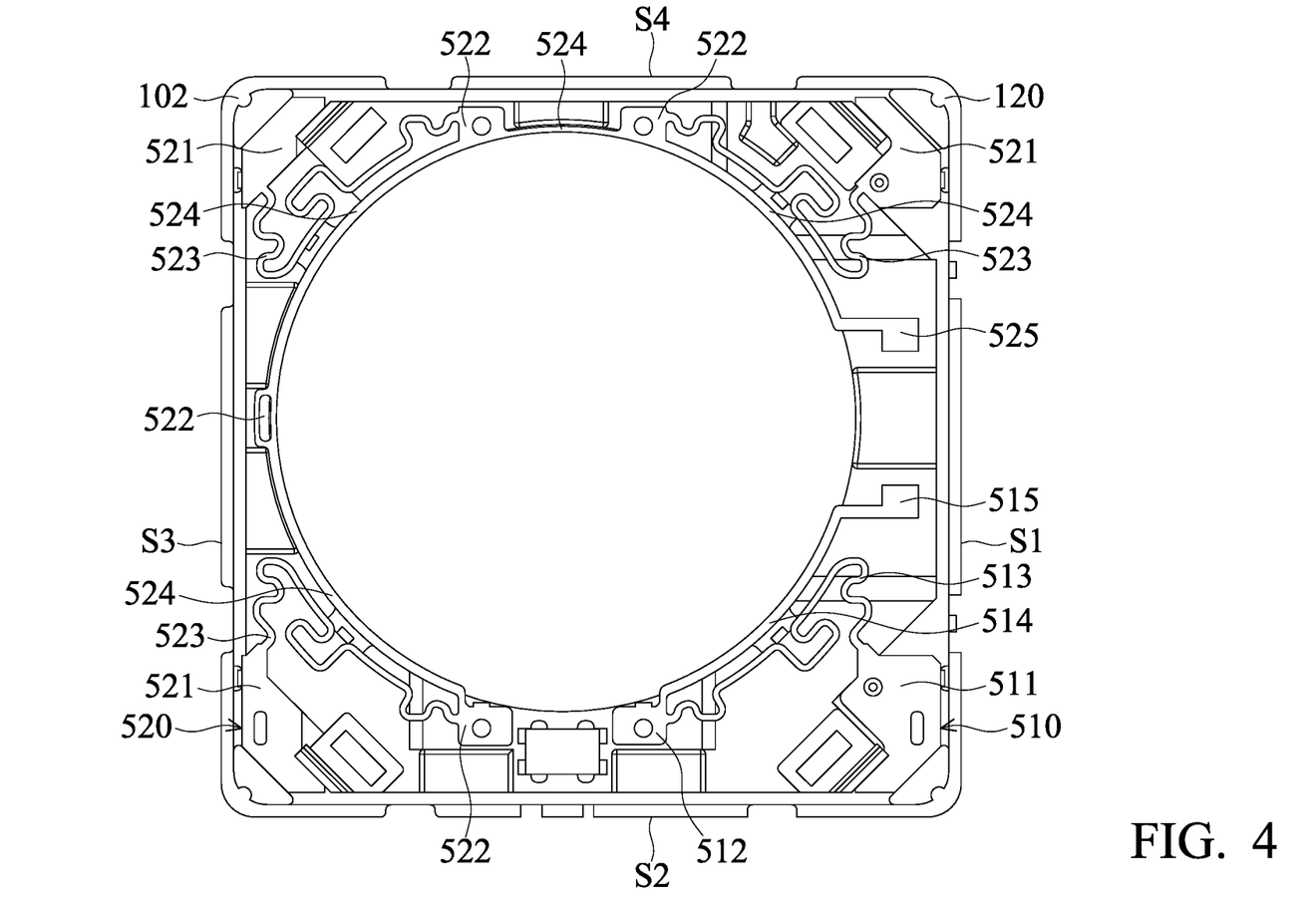
FIG. 4 is a top view of partial elements of an optical element driving mechanism according to an embodiment of the present disclosure.
Figure 5:
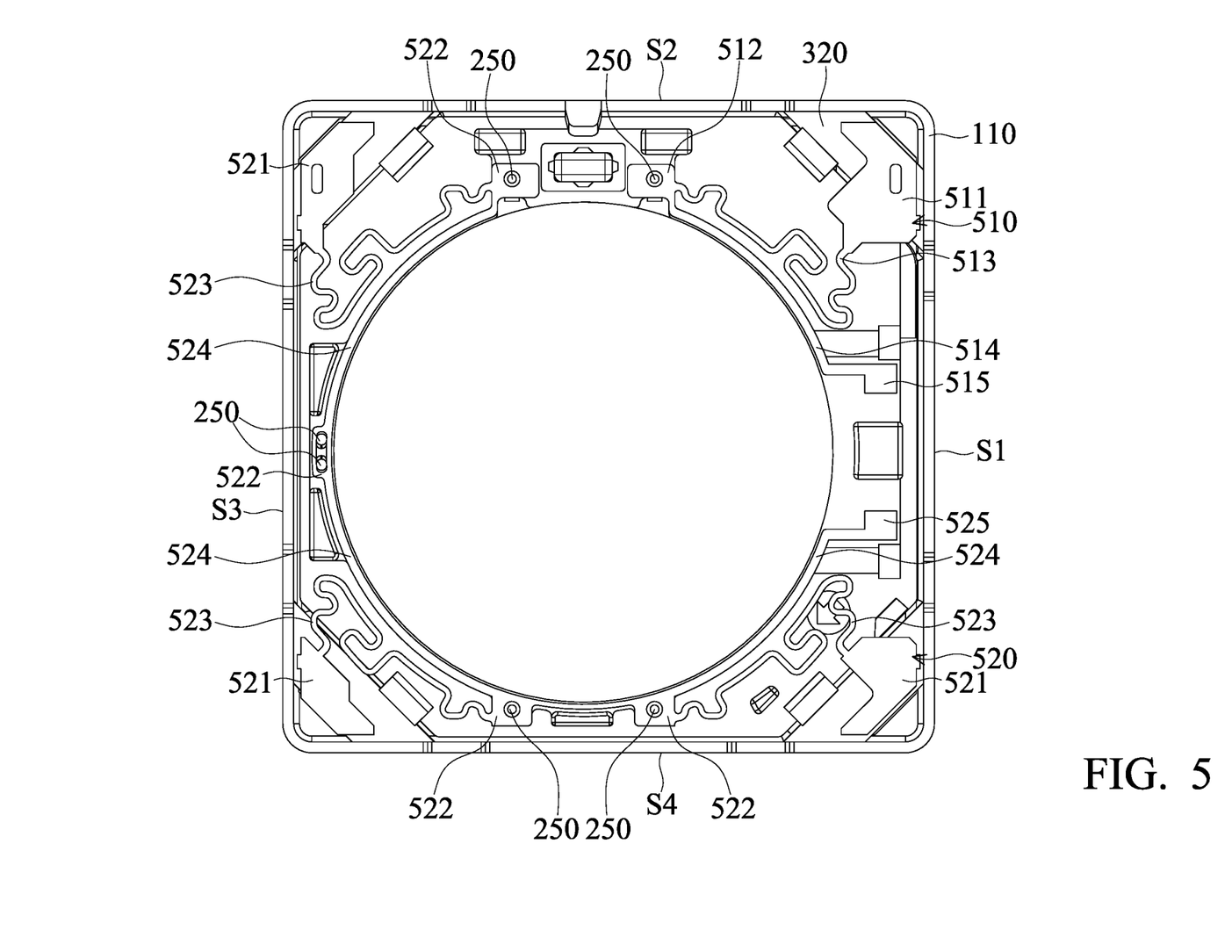
FIG. 5 is a bottom view of partial elements of an optical element driving mechanism according to an embodiment of the present disclosure.
Figure 6:
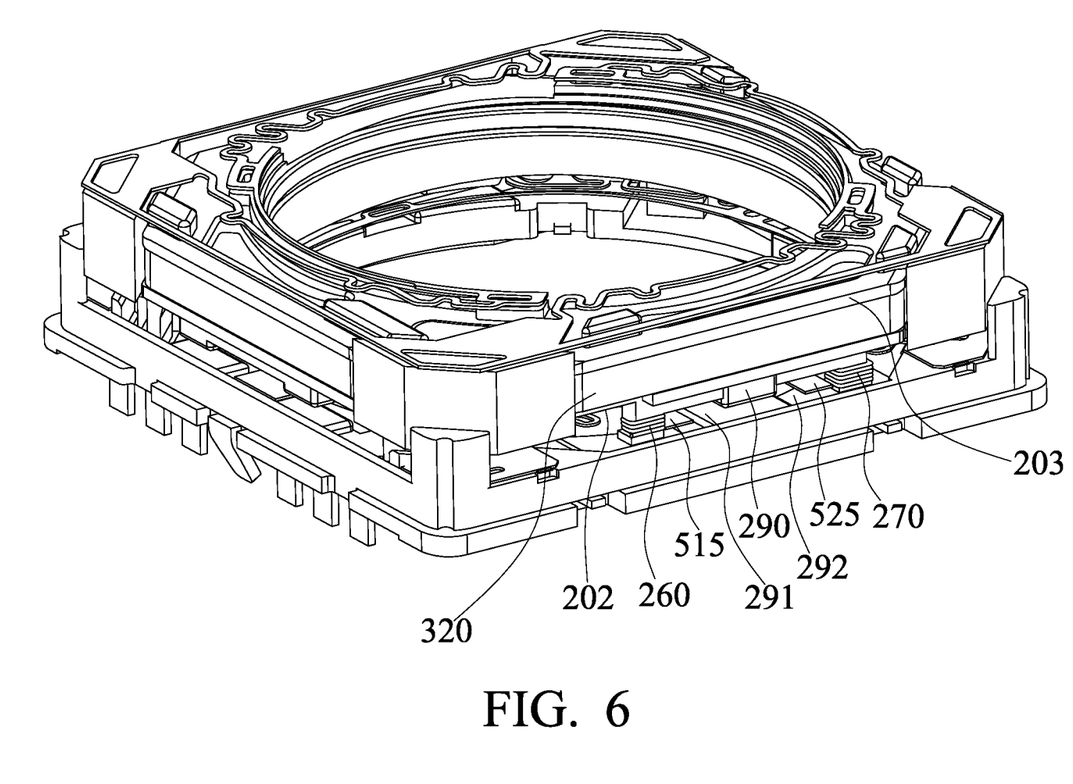
FIG. 6 is a perspective view of partial elements of an optical element driving mechanism according to an embodiment of the present disclosure.
Figure 7:
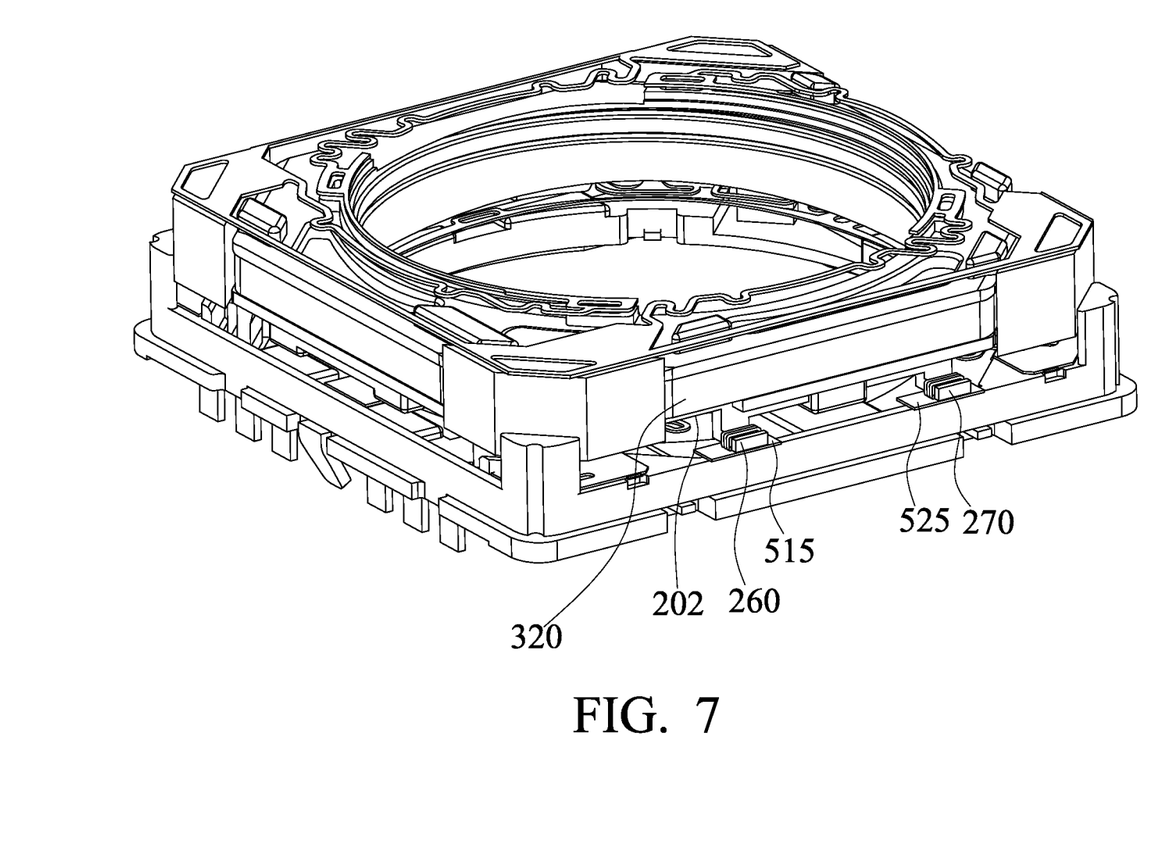
FIG. 7 is a perspective view of partial elements of an optical element driving mechanism according to another embodiment of the present disclosure.

Refer to FIG. 2 to FIG. 7. FIG. 3 is a top view of partial elements of the optical element driving mechanism 1 according to an embodiment of the present disclosure. FIG. 4 is a top view of partial elements of the optical element driving mechanism 1 according to an embodiment of the present disclosure. FIG. 5 is a bottom view of partial elements of the optical element driving mechanism 1 according to an embodiment of the present disclosure. FIG. 6 is a perspective view of partial elements of the optical element driving mechanism 1 according to an embodiment of the present disclosure. FIG. 7 is a perspective view of partial elements of an optical element driving mechanism 1 according to another embodiment of the present disclosure. The first elastic element 400 and the second elastic element 500 are connected to the movable portion 200 and the fixed portion 100, and the first elastic element 400 and the second elastic element 500 are arranged in a direction that is parallel to the optical axis O. When viewed in the direction that is parallel to the optical axis O, the first elastic element 400 and the second elastic element 500 at least partially overlap. As shown in FIG. 3, the first elastic element 400 has four fixed-portion-connecting portions 401, four movable-portion-connecting portions 402, four elastic portions 403, two inner auxiliary portions 404, and three outer auxiliary portions 405. The four fixed-portion-connecting portions 401 of the first elastic element 400 may be fixed on the four magnetic elements 320 by a bonding element (not shown, for example, a solder, a tin ball, a conductive glue, etc.). The four movable-portion-connecting portions 402 may be fixed on the positioning portion 250 on the upper surface 201 of the movable portion 200 by the bonding elements. The elastic portion 403 is made of elastic material and connects the fixed-portion-connecting portion 401 and the movable-portion-connecting portion 402. The two inner auxiliary portions 404 are respectively disposed on the second side S2 and the fourth side S4, and the inner auxiliary portion 404 is connected to two movable-portion-connecting portions 402. The three outer auxiliary portions 405 are respectively disposed on the first side S1, the second side S2, and the third side S3, and the outer auxiliary portion 405 is connected to two fixed-portion-connecting portions 401. The inner auxiliary portion 404 and the outer auxiliary portion 405 may be used to enhance the strength of the first elastic element 400.

Since the optical element driving mechanism 1 of this embodiment is an eccentric structure, the second side S2 with a larger space may be designed to have an elastic portion 403, an inner auxiliary portion 404, and an outer auxiliary portion 405, and have a relatively large space. On the other hand, the fourth side S4 with a smaller space may be designed to without the outer auxiliary portion 405. Therefore, the optical element driving mechanism 1 is minimized while the first elastic element 400 may still have a certain strength that will not easy to break. However, the number and arrangement of the fixed-portion-connecting portion 401, the movable-portion-connecting portion 402, the elastic portion 403, the inner auxiliary portion 404, and the outer auxiliary portion 405 are not limited to this, and may be changed according to requirements.

As shown in FIG. 4 and FIG. 5, the second elastic element 500 includes a first part 510 and a second part 520. The first part 510 and the second part 520 are not connected. When viewed in the direction that is parallel to the optical axis O, the first part 510 and the second part 520 do not overlap, and when viewed in the direction that is perpendicular to the optical axis O, the first part 510 and the second part 520 at least partially overlap. The first part 510 has a fixed-portion-connecting portion 511, a movable-portion-connecting portion 512, an elastic portion 513, an inner auxiliary portion 514, and a driving-portion-connecting portion 515. The fixed-portion-connecting portion 511 is fixedly connected to the base 120 of the fixed portion 100. The movable-portion-connecting portion 512 is fixedly connected to the positioning portion 250 of the lower surface 202 of the movable portion 200. The movable-portion-connecting portion 512 is movably connected to the fixed-portion-connecting portion 511 via the elastic portion 513. The inner auxiliary portion 514 is connected to the movable-portion-connecting portion 512 and the driving-portion-connecting portion 515. The driving-portion-connecting portion 515 is connected to one end of the driving coil 310 of the driving assembly 300.

The second part 520 has three fixed-portion-connecting portions 521, four movable-portion-connecting portions 522, three elastic portions 523, four inner auxiliary portions 524, and a driving-portion-connecting portion 525. The three fixed-portion-connecting portions 521 are respectively fixedly connected to the base 120 of the fixed portion 100. The four movable-portion-connecting portions 522 are fixedly connected to the positioning portions 250 of the movable portion 200, and the movable-portion-connecting portion 522 is movably connected to the fixed-portion-connecting portion 521 via the elastic portion 523. Three of the four inner auxiliary portions 524 are respectively connected to two movable-portion-connecting portions 522, and the remaining inner auxiliary portion 524 is connected to the movable-portion-connecting portion 522 and the driving-portion-connecting portion 525. The driving-portion-connecting portion 525 is connected to the other end of the driving coil 310 of the driving assembly 300.

That is, one end of the driving coil 310 is wound around the first winding column 260 and connected to the driving-portion-connecting portion 515 of the first part 510, and the other end of the driving coil 310 is wound around the second winding column 270 and connected to the driving-portion-connecting portion 525 of the second part 520. As shown in FIG. 6, in some embodiments, a partition portion 290 is disposed between the first winding column 260 and the second winding column 270, and a first accommodating portion 291 is formed between the partition portion 290 and the first winding column 260, and a second accommodating portion 292 is formed between the partition portion 290 and the second winding column 270. The first accommodating portion 291 accommodates the driving-portion-connecting portion 515 of the first part 510, and the second accommodating portion 292 accommodates the driving-portion-connecting portion 525 of the second part 520.

The driving-portion-connecting portion 515 of the first part 510 and the driving coil 310 wound around the first winding column 260 may be connected by the bonding element (for example, a solder, a tin ball, a conductive glue, etc.), and the driving-portion-connecting portion 525 of the second part 520 and the driving coil 310 wound around the second winding column 270 may be connected by the bonding element. When viewed in the direction that is parallel to the optical axis O, the driving-portion-connecting portion 515 of the first part 510 and the first winding column 260 do not overlap, and the driving-portion-connecting portion 525 of the second part 520 and the second winding column 270 do not overlap.

In other embodiments, as shown in FIG. 7, the first winding column 260 and the second winding column 270 extend from the side surface 203 toward the side wall 112 in a direction that is perpendicular to the optical axis O. The driving-portion-connecting portion 515 of the first part 510 and the driving coil 310 wound around the first winding column 260 are welded by laser, and the driving-portion-connecting portion 525 of the second part 520 and the driving coil 310 wound around the second winding column 270 are welded by laser. When viewed in a direction that is parallel to the optical axis O, the driving-portion-connecting portion 515 of the first part 510 overlaps the first winding column 260, and the driving-portion-connecting portion 525 of the second part 520 overlaps the second winding column 270.

In more detail, after the movable-portion-connecting portions 512, 522 pass through the positioning portion 250, the positioning portion 250 is first flattened at high temperature so that the movable-portion-connecting portions 512, 522 and the positioning portion 250 are fixed, so that the driving-portion-connecting portions 515, 525 may keep in contact with the driving coil 310 to avoid displacement during subsequent assembling. Since the driving coil 310 and the second elastic element 500 may be made of the same material (for example, copper), no additional bonding element is required. The driving coil 310 and the second elastic element 500 may be directly connected by melting with a laser. Besides, in order to increase a contact area between the driving-portion-connecting portions 515 and 525 and the driving coil 310, an area of the driving-portion-connecting portions 515 and 525 may be designed to be larger than a winding area of the driving coil 310 on the first winding column 260 or the second winding column 270, or a width of the first winding column 260 or the second winding column 270 may be designed to be wider.

In addition, a plurality of holes may be disposed on the flat plate-shaped driving-portion-connecting portions 515 and 525. In more detail, the holes are disposed adjacent to a part welded by laser, and are used as heat insulation to avoid that other components will be affected by heat conduction during high-temperature welding. In addition, since the first winding column 260 and the second winding column 270 are usually made of plastic, it is also possible to embed metal sheets in the first winding column 260 and the second winding column 270 to increase the bonding strength during laser welding.

In the embodiment of FIG. 6, the contact between the flat plate-shaped driving-portion-connecting portions 515 and 525 and the driving coil 310 is line contact. On the contrary, in the embodiment of FIG. 7, the contact between the driving-portion-connecting portions 515, 525 and the driving coil 310 is surface contact which has a larger contact area, and therefore may have better connection strength.

Back to FIG. 2, the position sensing assembly 600 is disposed on the second side S2, which is different from the side where the first winding column 260 and the second winding column 270 are disposed, so as to make full use of the space in the optical element driving mechanism 1 to achieve the purpose of minimization. At least a part of the position sensing assembly 600 is disposed on the movable portion 200, and at least another part of the position sensing assembly 600 is disposed on the fixed portion 100. For example, the position sensing assembly 600 may include a reference element 610 and a position sensing element 620. The reference element 610 may be a magnet, which is disposed on the movable portion 200. The position sensing element 620 may be, for example, a Hall effect sensor, a magnetoresistive sensor (MR sensor), a tunnel magnetoresistance effect sensor, or a fluxgate sensor, etc., which is disposed on the base 120 of the fixed portion 100, and may sense the magnetic field of the reference element 610 disposed on the movable portion 200 to obtain the position of the movable portion 200 relative to the base 120. When viewed in a direction that is parallel to the optical axis, the reference element 610 and the position sensing element 620 at least partially overlap. However, the configuration of the reference element 610 and the position sensing element 620 is not limited to this, and the position sensing element 620 may be disposed on the movable portion 200 and the reference element 610 may be disposed on the fixed portion 100.

Figure 8:
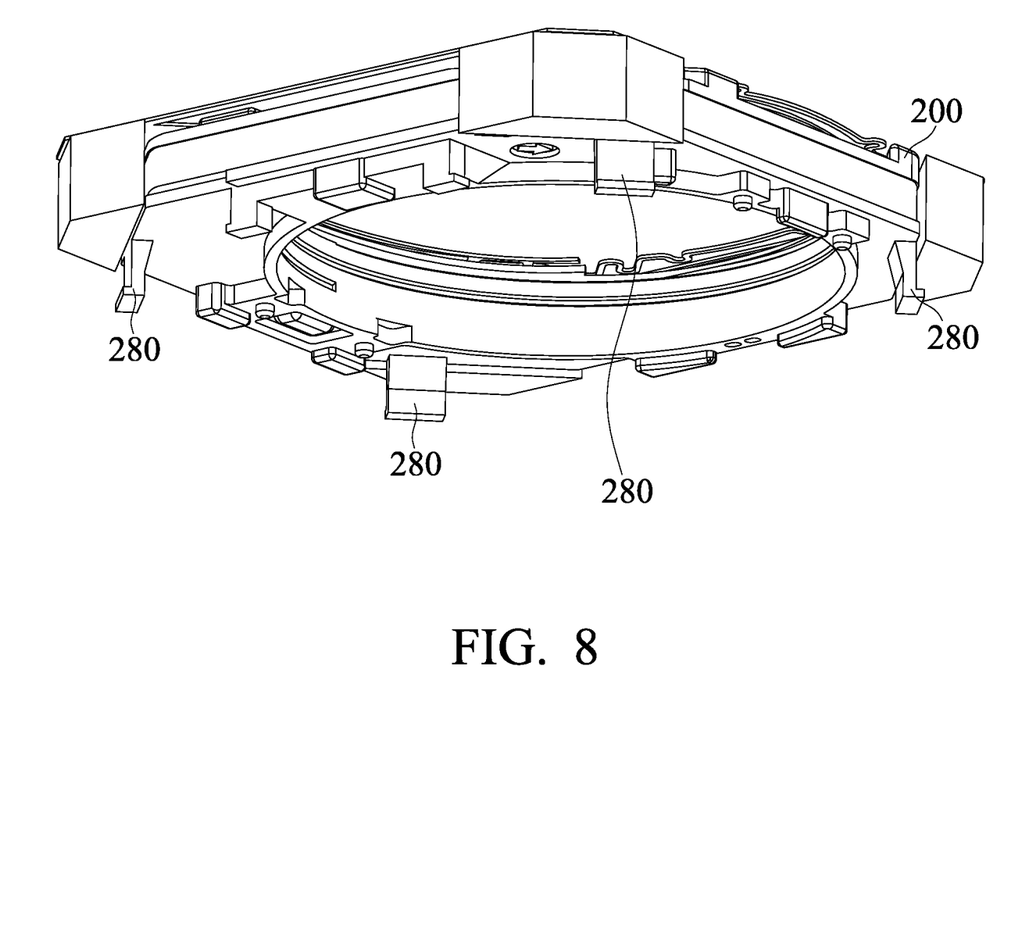
FIG. 8 is a perspective view of partial elements of an optical element driving mechanism according to an embodiment of the present disclosure.
Figure 9:
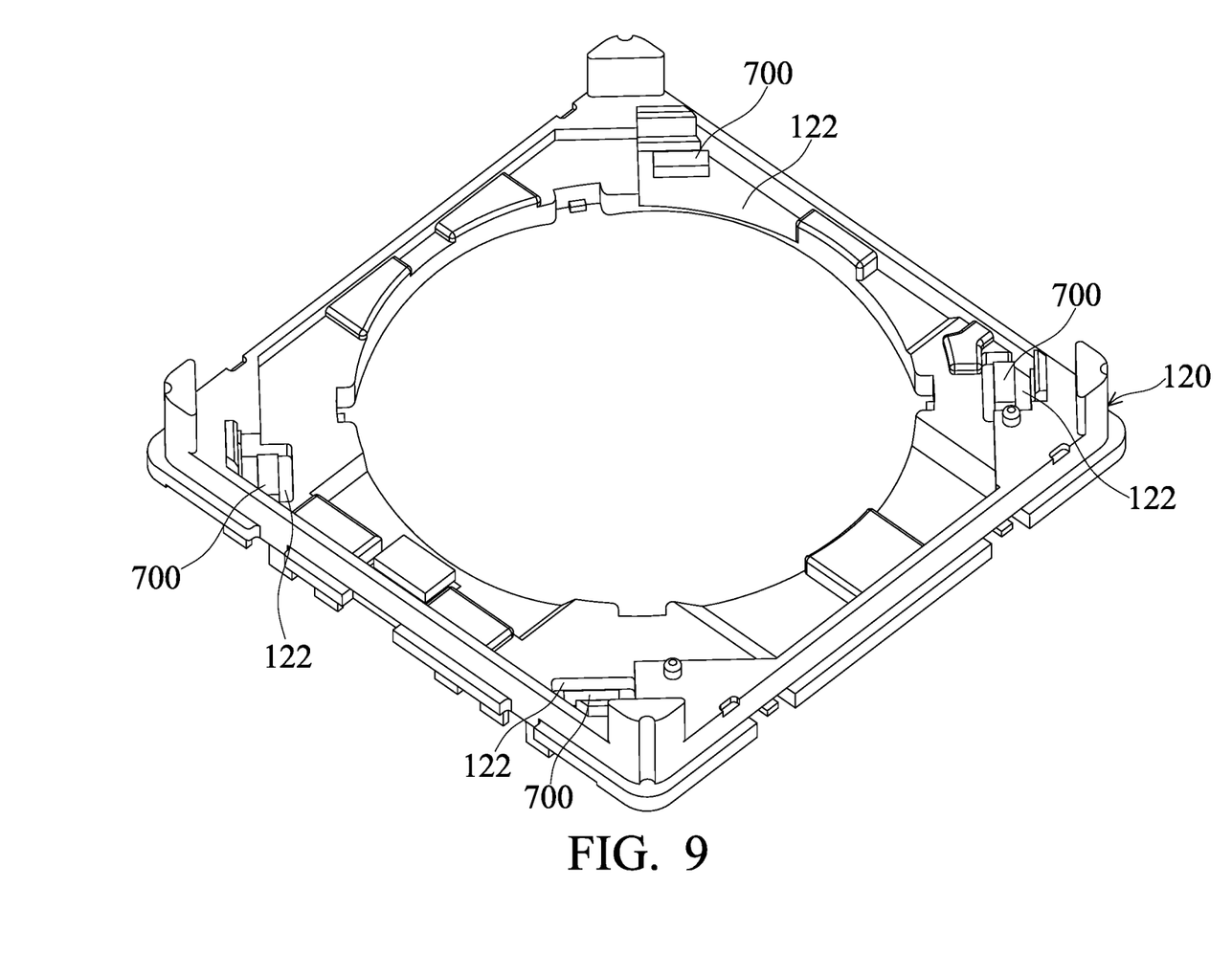
FIG. 9 is a perspective view of partial elements of an optical element driving mechanism according to an embodiment of the present disclosure.

Refer to FIG. 8 and FIG. 9. FIG. 8 is a perspective view of partial elements of the optical element driving mechanism 1 according to an embodiment of the present disclosure. FIG. 9 is a perspective view of partial elements of the optical element driving mechanism 1 according to an embodiment of the present disclosure. The damping element 700 is disposed between the convex portion 280 of the movable portion 200 and the concave portion 122 of the base 120. In some embodiments, the four damping elements 700, the four concave portions 122, and the four convex portions 280 are respectively disposed adjacent to the four corners of the rectangular structure, forming four stabilizing assemblies. When viewed in the direction that is parallel to the optical axis O, the convex portion 280, the damping element 700, and concave portion 122 in any one of the four stabilizing assemblies at least partially overlap. In more detail, in this embodiment, the damping element 700 is disposed on a surface of the concave portion 122, such that a bottom surface of the convex portion 280 contacts the damping element 700. But it is not limited to this, in other embodiments, the damping element 700 may be disposed on a side surface of the concave portion 122, such that a side surface of the convex portion 280 contacts the damping element 700. Both of the above two configurations may improve the stability of the movable portion 200 during movement and reduce resonance.

Figure 10:
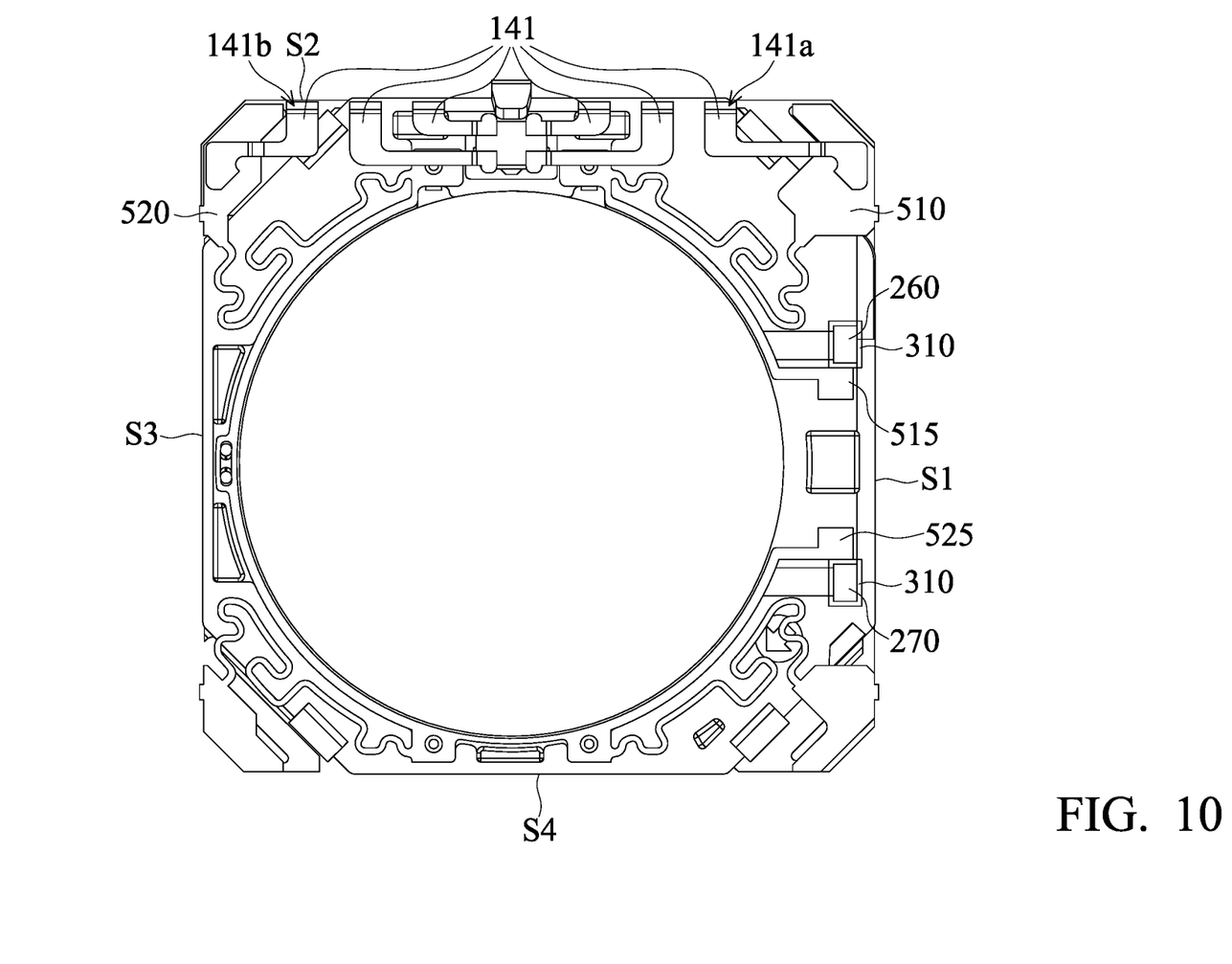
FIG. 10 is a bottom view of partial elements of the optical element driving mechanism according to an embodiment of the present disclosure.

Next, refer to FIG. 2, FIG. 4, FIG. 6, and FIG. 10 to describe the electrical connection of the optical element driving mechanism 1. FIG. 10 is bottom view of partial elements of the optical element driving mechanism 1 according to an embodiment of the present disclosure. As shown in FIG. 10, the six electrical connection elements 141 include a first electrical connection element 141a and a second electrical connection element 141b. The first electrical connection element 141a is connected to the first part 510 of the second elastic element 500, and the second electrical connection element 141b is connected to the second part 520 of the second elastic element 500. A current is input to the first electrical connection element 141a, the current flows to the driving coil 310 through the first part 510, and then to the second part 520 through the driving coil 310, and is output by the second electrical connection element 141b. With the optical element driving mechanism 1 of the present disclosure, since the input and output of the current are both on the same side, not only the space on the wider side is fully utilized, but also the number of assembling and welding may be reduced when it is subsequently assembled with other optical element driving mechanisms. Therefore, the production efficiency of the follow-up assembly is improved.

As described above, the embodiment of the present disclosure provides an optical element driving mechanism having an optical axis, including a fixed portion, a movable portion, and a driving assembly. The movable portion is connected to the fixed portion, and the driving assembly drives the movable portion to move in a direction that is parallel to the optical axis relative to the fixed portion. When viewed in the direction that is parallel to the optical axis, the optical element driving mechanism has a rectangular structure with a first side, a second side, a third side, and a fourth side, the first side is opposite to the third side, and the first side is adjacent to the second side and the fourth side. Since it is eccentric on two sides, the optical element driving mechanism may be thinned on two sides. The special position and size relationship of each element disclosed in the present invention may enable the optical system to achieve a specific direction of thinning and overall miniaturization. In addition, by applying with different optical modules, the optical module may further improve the optical quality (such as shooting quality or depth sensing accuracy, etc.) of the optical system.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism with an optical axis, comprising:
    a fixed portion;
    a movable portion, connected to the fixed portion, comprising:
        a through hole, wherein the through hole has a center, and the optical axis passes through the center of the through hole;
        a receiving groove, disposed on the first side and the second side;
        a counterweight element, disposed on the receiving groove;
        a first groove, disposed on the first side; and
        a second groove, disposed on the second side; and
    a driving assembly, driving the movable portion to move in a direction that is parallel to the optical axis relative to the fixed portion;
    wherein when viewed in the direction that is parallel to the optical axis, the optical element driving mechanism has a rectangular structure with a first side, a second side, a third side, and a fourth side, and the first side is opposite the third side, and the first side is adjacent to the second side and the fourth side;
    wherein a shortest distance from the center of the through hole to the first side is greater than a shortest distance from the center of the through hole to the third side, and the shortest distance from the center of the through hole to the first side is greater than a shortest distance from the center of the through hole to the fourth side.

2. The optical element driving mechanism as claimed in claim 1, wherein a shortest distance from the center of the through hole to the second side is greater than the shortest distance from the center of the through hole to the third side, and the shortest distance from the center of the through hole to the second side is greater than the shortest distance from the center of the through hole to the fourth side.

3. The optical element driving mechanism as claimed in claim 1, wherein the fixed portion comprises a base, a first circuit component, a second circuit component, and a housing, the first circuit component and the second circuit component are disposed on the base, the housing is connected to the base, wherein the first circuit component and the second circuit component are electrically independent of each other.

4. The optical element driving mechanism as claimed in claim 3, wherein the first circuit component is disposed on the first side, the fourth side, and the third side, and the second circuit component has a plurality of electrical connection elements disposed on the second side, wherein the housing has a ground element, the ground element is disposed on the second side, and the ground element is disposed between the electrical connection elements.

5. The optical element driving mechanism as claimed in claim 1, further comprising a position sensing assembly, which is disposed on the second side, and comprises:
    a reference element; and
    a position sensing element, corresponding to the reference element to sense the movement of the movable portion relative to the fixed portion.

6. The optical element driving mechanism as claimed in claim 5, wherein when viewed in the direction that is parallel to the optical axis, the reference element and the position sensing element at least partially overlap.

7. An optical element driving mechanism with an optical axis, comprising:
    a fixed portion;
    a movable portion, connected to the fixed portion;
    a driving assembly, driving the movable portion to move in a direction that is parallel to the optical axis relative to the fixed portion; and
    a first elastic element and a second elastic element, connected to the movable portion and the fixed portion, wherein when viewed in the direction that is parallel to the optical axis, the first elastic element and the second elastic element at least partially overlap,
    wherein when viewed in the direction that is parallel to the optical axis, the optical element driving mechanism has a rectangular structure with a first side, a second side, a third side, and a fourth side, and the first side is opposite the third side, and the first side is adjacent to the second side and the fourth side.

8. The optical element driving mechanism as claimed in claim 7, wherein the first elastic element has:
   a plurality of fixed-portion-connecting portions, fixedly connected to the fixed portion;
   a plurality of movable-portion-connecting portions, fixedly connected to the movable portion;
   a plurality of elastic portions, having an elastic material, and the movable-portion-connecting portions are movably connected to the fixed-portion-connecting portions via the elastic portions;
   a plurality of inner auxiliary portions, disposed on the second side and the fourth side, and each of the inner auxiliary portions is connected to two movable-portion-connecting portions; and
   a plurality of external auxiliary portions, disposed on the first side, the second side, and the third side, and each of the external auxiliary portions is connected to two fixed-portion-connecting portions.

9. The optical element driving mechanism as claimed in claim 7, wherein the second elastic element comprises:
   a first part, has:
      a fixed-portion-connecting portion, fixedly connected to the fixed portion;
      a movable-portion-connecting portion, fixedly connected to the movable portion;
      an elastic portion, having an elastic material, and the movable-portion-connecting portion is movably connected to the fixed-portion-connecting portion via the elastic portion; and
      a driving-portion-connecting portion, extending from the movable-portion-connecting portion to be connected to the driving assembly; and
   a second part, has:
      a plurality of fixed-portion-connecting portions, fixedly connected to the fixed portion;
      a plurality of movable-portion-connecting portions, fixedly connected to the movable portion;
      a plurality of elastic portions, having an elastic material, and the movable-portion-connecting portions are movably connected to the fixed-portion-connecting portions via the elastic portions; and
      a driving-portion-connecting portion, extending from the movable-portion-connecting portion to be connected to the driving assembly.

10. The optical element driving mechanism as claimed in claim 9, wherein the first part is not connected to the second part.

11. The optical element driving mechanism as claimed in claim 9, wherein the movable portion further comprises a first winding column and a second winding column, the first winding column and the second winding column are disposed on the first side, and the driving assembly comprises a driving coil, the driving coil is disposed on a side surface of the movable portion, and one end of the driving coil is wound around the first winding column and is connected to the driving-portion-connecting portion of the first part, and the other end of the driving coil is wound around the second winding column and is connected to the driving-portion-connecting portion of the second part.

12. The optical element driving mechanism as claimed in claim 11, wherein a partition portion is disposed between the first winding column and the second winding column, and a first accommodating portion is formed between the partition portion and the first winding column, and a second accommodating portion is formed between the partition and the second winding column, the first accommodating portion accommodates the driving-portion-connecting portion of the first part, and the second accommodating portion accommodates the driving-portion-connecting portion of the second part.

13. The optical element driving mechanism as claimed in claim 12, wherein the driving-portion-connecting portion of the first part is connected to the driving coil wound around the first winding column by a bonding element, and the driving-portion-connecting portion of the second part is connected to the driving coil wound around the second winding column by another bonding element.

14. The optical element driving mechanism as claimed in claim 13, wherein when viewed in the direction that is parallel to the optical axis, the driving-portion-connecting portion of the first part and the first winding column does not overlap, and the driving-portion-connecting portion of the second part and the second winding column does not overlap.

15. The optical element driving mechanism as claimed in claim 11, wherein the driving-portion-connecting portion of the first part and the driving coil wound around the first winding column are welded by laser, and the driving-portion-connecting portion of the second part and the driving coil wound around the second winding column are welded by laser.

16. The optical element driving mechanism as claimed in claim 15, wherein when viewed in the direction that is parallel to the optical axis, the driving-portion-connecting portion of the first part overlaps the first winding column, and the driving-portion-connecting portion of the second part overlaps the second winding column.

17. An optical element driving mechanism with an optical axis, comprising:
   a fixed portion;
   a movable portion, connected to the fixed portion;
   a driving assembly, driving the movable portion to move in a direction that is parallel to the optical axis relative to the fixed portion; and
   a damping element, wherein the fixed portion comprises a base, and the base has a concave portion, the movable portion has a convex portion, and the convex portion corresponds to the concave portion, and the damping element is disposed between the convex portion and the concave portion,
   wherein when viewed in the direction that is parallel to the optical axis, the optical element driving mechanism has a rectangular structure with a first side, a second side, a third side, and a fourth side, and the first side is opposite the third side, and the first side is adjacent to the second side and the fourth side.

18. The optical element driving mechanism as claimed in claim 17, further comprising three other damping elements, wherein the base further has three other concave portions, the movable portion further has three other convex portions, and the four damping elements, the four concave portions, and the four convex portions are respectively disposed adjacent to four corners of the rectangular structure, and are formed four stabilizing assemblies.

19. The optical element driving mechanism as claimed in claim 18, wherein when viewed in the direction that is parallel to the optical axis, the convex portion, the damping element, and the concave portion in any one of the four stabilizing assemblies at least partially overlap.

* * * * *